United States Patent
Sato (10) Patent No.: US 8,467,542 B2
(45) Date of Patent: Jun. 18, 2013

(54) SOUND RECORDING DEVICE, SOUND RECORDING METHOD, AND SOUND RECORDING PROGRAM EMBODIED ON COMPUTER READABLE MEDIUM

(75) Inventor: Hiroyoshi Sato, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 178 days.

(21) Appl. No.: 12/608,166

(22) Filed: Oct. 29, 2009

(65) Prior Publication Data

US 2010/0106272 A1 Apr. 29, 2010

(30) Foreign Application Priority Data

Oct. 29, 2008 (JP) .................................. 2008-278847

(51) Int. Cl.
*H04R 3/00* (2006.01)

(52) U.S. Cl.
USPC ................. 381/92; 381/81; 381/91; 381/122; 381/123

(58) Field of Classification Search
USPC ............... 381/92, 91, 122, 123, 81, 333, 334, 381/80; 700/94; 463/35; 352/1–37
See application file for complete search history.

(56) References Cited

U.S. PATENT DOCUMENTS

| | | | | |
|---|---|---|---|---|
| 2006/0142070 A1* | 6/2006 | Park | ............................ | 455/569.1 |
| 2007/0291024 A1* | 12/2007 | Imai et al. | ...................... | 345/212 |
| 2008/0056457 A1* | 3/2008 | Hsu | ............................. | 379/88.03 |
| 2009/0129620 A1* | 5/2009 | Tagawa et al. | ................ | 381/364 |

FOREIGN PATENT DOCUMENTS

| | | |
|---|---|---|
| JP | 2000-137498 A | 5/2000 |
| JP | 2002-010133 A | 1/2002 |
| JP | 2002-345074 A | 11/2002 |
| JP | 2004254074 | 9/2004 |
| JP | 2005-026956 A | 1/2005 |
| JP | 2005-176138 A | 6/2005 |
| JP | 2006-191571 A | 7/2006 |
| JP | 2007-005849 A | 1/2007 |

OTHER PUBLICATIONS

Sony Marketing (Japan) Inc.; Web pages on ICD-SX67; 2009; pp. 1-2 and partial translation.
Notice of Ground of Rejection issued in the corresponding Japanese Patent Application No. 2008-278847, dated Oct. 16, 2012.
English language abstract of JP 2000-137498 published May 16, 2000.
English language abstract of JP 2002-010133 published Jan. 11, 2002.

* cited by examiner

*Primary Examiner* — Vivian Chin
*Assistant Examiner* — Paul Kim
(74) *Attorney, Agent, or Firm* — Novak Druce Connolly Bove + Quigg LLP (57) ABSTRACT

In order to facilitate the operation to select a directional microphone and a non-directional microphone, an IC recorder includes a directional microphone having directivity, a non-directional microphone not having directivity, a scene selection portion to select one of the four scenes of oral dictation, conference, lecture, and music, a first EEPROM for storing in advance a correspondence table that assigns either one of the directional microphone and the non-directional microphone to each of the four scenes, and a microphone switching portion to switch, between the directional microphone and the non-directional microphone, to the one assigned to the selected scene by the correspondence table in response to one of the four scenes being selected by the scene selection portion.

9 Claims, 11 Drawing Sheets

| SCENE INFORMATION | ORAL DICTATION | CONFERENCE | LECTURE | MUSIC | FAVORITE |
|---|---|---|---|---|---|
| ALC | ON | ON | ON | OFF | ON |
| MICROPHONE SENSITIVITY | LOW | HIGH | HIGH | HIGH | HIGH |
| LOW-CUT FILTER | ON | ON | ON | OFF | OFF |
| TYPE OF MICROPHONE | NON-DIRECTIONAL | NON-DIRECTIONAL | DIRECTIONAL | DIRECTIONAL | NON-DIRECTIONAL |
| SOUND RECORDING MODE | MP3:64kbps | MP3:128kbps | MP3:128kbps | PCM:1536kbps | MP3:128kbps |
| VAS | OFF | OFF | OFF | OFF | OFF |
| SOUND RECORDING PEAK LIMITER | OFF | OFF | OFF | OFF | OFF |

SOUND RECORDING DEVICE, SOUND RECORDING METHOD, AND SOUND RECORDING PROGRAM EMBODIED ON COMPUTER READABLE MEDIUM

This application is based on Japanese Patent Application No. 2008-278847 filed with Japan Patent Office on Oct. 29, 2008, the entire content of which is hereby incorporated by reference.

BACKGROUND OF THE INVENTION

1. Field of the Invention

The present invention relates to a sound recording device, a sound recording method, and a computer-readable storage medium storing a sound recording program, and more specifically to a sound recording device having a directional microphone and a non-directional microphone, a sound recording method executed in such sound recording device, and a computer-readable storage medium storing a sound recording program executed in such sound recording device.

2. Description of the Related Art

A sound recording and replaying device which is provided with a directional microphone and a non-directional microphone and which allows switching between the mode of recording a sound signal from the directional microphone and the mode of recording a sound signal from the non-directional microphone is described in Japanese Patent Laid-Open No. 2004-254074.

The switching of modes, however, requires a user to determine the source where the sound is generated from and to determine which of the directional microphone and the non-directional microphone is suited for the recording of the sound signal. Moreover, normally, in order to switch the modes, the window for switching of the modes which is located in a subclass of a menu window or the like must be found and be displayed, and then the mode is switched, which causes the problem where the operation for switching the modes becomes complicated.

SUMMARY OF THE INVENTION

The present invention is made to solve the above-described problem, and an object of the present invention is to provide a sound recording device, a sound recording method, and a computer-readable storage medium storing a sound recording program which facilitate the operation of selecting a directional microphone and a non-directional microphone.

Another object of the present invention is to provide a sound recording device, a sound recording method, and a computer-readable storage medium storing a sound recording program which facilitate the operation of setting for a recording.

To achieve the above-described objects, according to one aspect of the present invention, the sound recording device includes a first microphone having directivity, a second microphone not having directivity, a selection portion to select one of a plurality of scenes, a storing portion to store in advance a correspondence table that assigns either one of the first and second microphones to each of a plurality of scenes, and a microphone switching control portion to switch, between the first and second microphones, to the one assigned to the selected scene by the correspondence table in response to one of a plurality of scenes being selected by the selection portion.

According to another aspect of the present invention, the sound recording method is for controlling a sound recording device that includes a first microphone having directivity, and a second microphone not having directivity, and includes the steps of selecting one of a plurality of scenes, and switching, between the first and second microphones, to the one assigned to the selected scene by a correspondence table that assigns either one of the first and second microphones to each of a plurality of scenes, in response to one of a plurality of scenes being selected in the selecting step.

According to a further aspect of the present invention, the sound recording program embodied on a computer readable medium and executed by a computer controlling a sound recording device having a first microphone having directivity, and a second microphone not having directivity, the sound recording program causing the computer to execute the steps of selecting one of a plurality of scenes, and switching, between the first and second microphones, to the one assigned to the selected scene by a correspondence table that assigns either one of the first and second microphones to each of a plurality of scenes, in response to one of a plurality of scenes being selected in the selecting step.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An IC recorder in one embodiment of a sound recording device according to the present invention will be described below with reference to the drawings.

In the following description, the same or corresponding parts are denoted by the same reference characters. Their names and function are also the same. Thus, the detailed description thereof will not be repeated.

Figure 1:
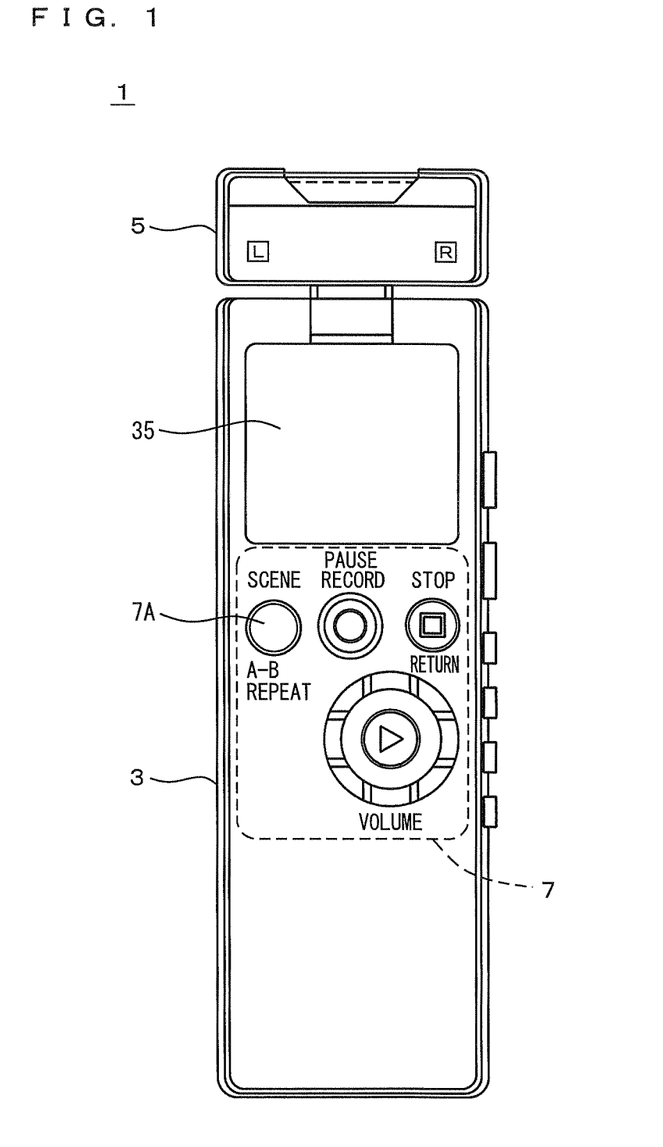
FIG. 1 is a plan view of an IC (Integrated Circuit) recorder.

FIG. 1 is a plan view of an IC recorder. With reference to FIG. 1, an IC recorder 1 includes a body portion 3, and a sound collecting portion 5 having a directional microphone and a non-directional microphone built inside.

Sound collecting portion 5 is connected in a manner that allows biaxial rotation via a hinge mechanism in relation to body portion 3, and the direction of sound collecting portion 5 can be changed relative to body portion 3.

Body portion 3 is provided with a liquid crystal display (LCD) 35 and, below it, an operation portion 7 having multiple kinds of keys. Operation portion 7 includes a scene key 7A which is a hard key for selecting a scene. The hard key is a contact switch. Moreover, instead of LCD 35, a display such as an organic ELD (Electro Luminescence Display) and the like may be used.

Figure 2:
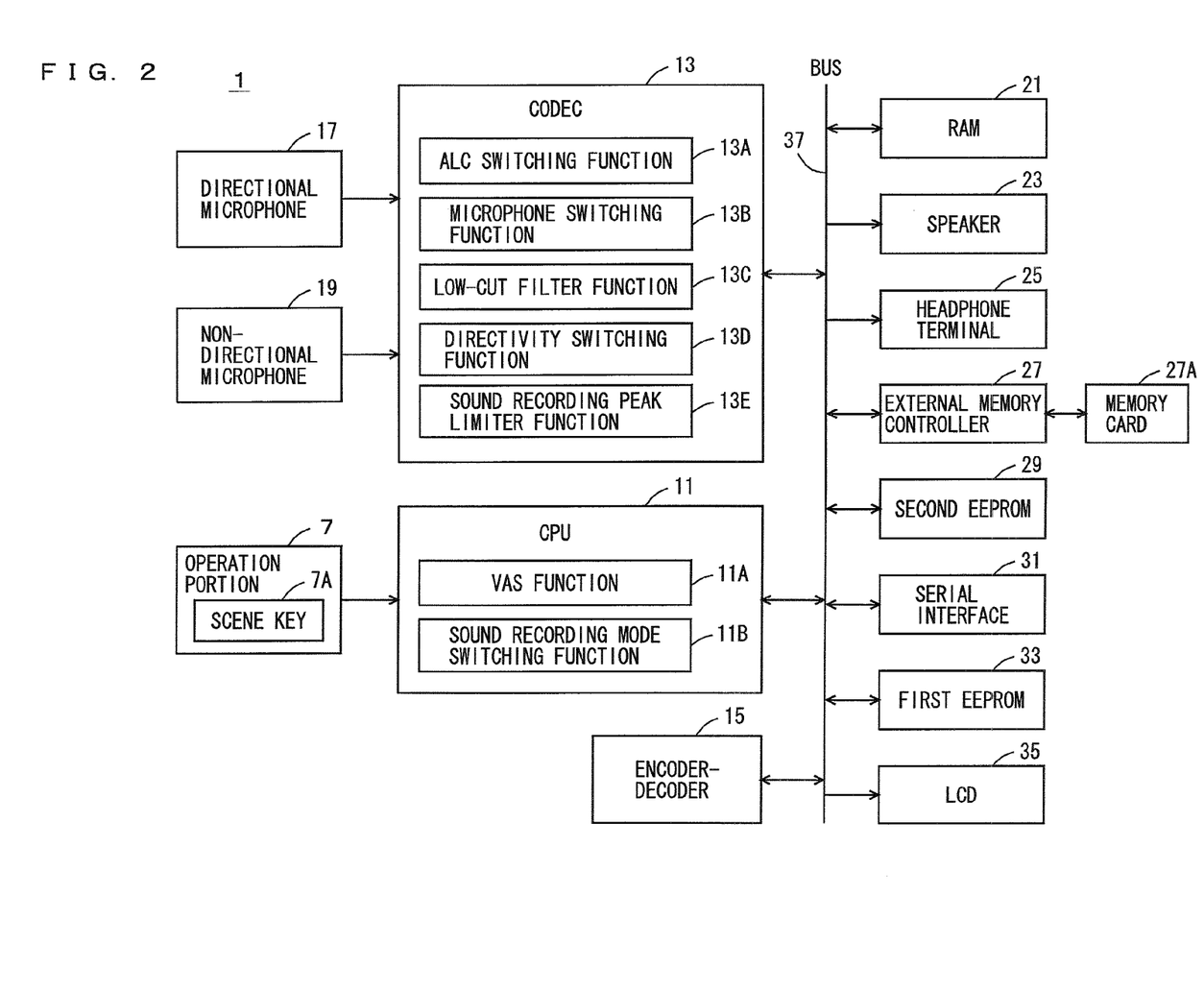
FIG. 2 is a functional block diagram showing an overview of a hardware arrangement of the IC recorder.

FIG. 2 is a functional block diagram showing an overview of the hardware arrangement of the IC recorder. With reference to FIG. 2, IC recorder 1 includes a central processing unit (CPU) 11 for controlling the entire IC recorder 1, and a codec 13, an encoder-decoder 15, a RAM (Random Access Memory) 21, a speaker 23, a headphone terminal 25, an external memory controller 27, a second EEPROM (Electrically Erasable and Programmable Read Only Memory) 29, a serial interface (I/F) 31, a first EEPROM 33, and LCD 35, each connected to CPU 11 via a bus 37.

CPU 11 is connected to operation portion 7 and accepts the operation that the user inputs into operation portion 7. Moreover, operation portion 7 includes scene key 7A, and when the user presses scene key 7A, CPU 11 detects the fact that scene key 7A has been pressed and accepts a scene select instruction.

RAM 21 is used as a work area for CPU 11. First EEPROM 33 stores the programs and the like executed by CPU 11. Second EEPROM 29 is an internal memory for storing a compressed sound signal and the like in a non-volatile manner. A memory card 27A is connected to external memory controller 27. Via external memory controller 27, CPU 11 is able to access memory card 27A connected to external memory controller 27.

Serial interface 31 is connected to a device capable of serial communication. CPU 11 is capable of communicating via serial interface 31 with a device connected to serial interface 31. Headphone terminal 25 has a headphone or an earphone and the like connected thereto, and outputs an analog sound signal to them. Speaker 23 receives the input of the analog sound signal and outputs a sound.

Codec 13 has a directional microphone 17 and a non-directional microphone 19 connected thereto, converts the analog sound signal inputted from either directional microphone 17 or non-directional microphone 19 into a digital signal, and after prescribed signal processing, outputs to CPU 11 the sound signal that has undergone digitization.

Codec 13 has, in order to process the digital signal, an auto level control (ALC) portion 13A, a sensitivity switching portion 13B for switching the sensitivity of a microphone, a low-cut filter portion 13C, a microphone switching portion 13D for switching the microphones, and a sound recording peak limiter portion 13E.

Based on an instruction from CPU 11, microphone switching portion 13D switches the sound signal to be the object of processing to one of the analog sound signals respectively outputted from directional microphone 17 and non-directional microphone 19.

Auto level control portion 13A adjusts the input level of the sound signal to be the object of processing based on an instruction from CPU 11. For instance, it adjusts the input levels of high range and low range. More specifically, auto level control portion 13A adjusts the input level of the sound signal to be the object of processing when the instruction for making the auto level control effective is inputted from CPU 11, and does not adjust the input level of the sound signal to be the object of processing when the instruction for making the auto level control ineffective is inputted.

Sensitivity switching portion 13B switches the sensitivity of the microphone of the sound signal to be the object of processing to either a high sensitivity or a low sensitivity based on an instruction from CPU 11. More specifically, sensitivity switching portion 13B sets the sensitivity of the microphone to high when the instruction to set to high sensitivity is inputted from CPU 11, and sets the sensitivity of the microphone to low when the instruction to set to low sensitivity is inputted.

Low-cut filter portion 13C switches between cutting and not cutting a sound in a low band of the sound signal to be the object of processing based on an instruction from CPU 11. More specifically, low-cut filter portion 13C cuts the sound in the low band of the sound signal to be the object of processing if the instruction to make the low-cut filter effective is inputted from CPU 11, while it does not cut the sound in the low band of the sound signal to be the object of processing if the instruction to make the low-cut filter ineffective is inputted.

Sound recording peak limiter portion 13E switches between setting and not setting the volume level of the sound signal to be the object of processing to a prescribed value and below based on an instruction from CPU 11. More specifically, sound recording peak limiter portion 13E sets the volume level of the sound signal to be the object of processing to a prescribed value and below if the instruction to make the sound recording peak limiter effective is inputted from CPU 11, but it does not set the volume level of the sound signal to be the object of processing to the prescribed value and below if the instruction to make the sound recording peak limiter ineffective is inputted.

Encoder-decoder 15 is controlled by CPU 11 to encode the sound signal outputted from codec 13. Moreover, encoder-decoder 15 is controlled by CPU 11 to decode the encoded sound signal.

While the sound signal outputted from directional microphone 17 or non-directional microphone 19 is converted into a digital signal by codec 13, CPU 11 causes encoder-decoder 15 to encode the sound signal outputted from codec 13, and stores the encoded sound signal in second EEPROM 29 or in memory card 27A connected to external memory controller 27.

Moreover, CPU 11 reads the sound signal stored in second EEPROM 29 or in memory card 27A connected to external memory controller 27, causes encoder-decoder 15 to decode it, causes codec 13 to convert the decoded sound signal into an analog signal, and outputs the analog sound signal to speaker 23 or to a headphone connected to headphone terminal 25.

Furthermore, CPU 11 has a VAS (Voice Active System) portion 11A and a sound recording mode switching portion 11B. When the VAS is set to effective, VAS portion 11A controls encoder-decoder 15 to cut the sound signal of a silent portion in sound data so as to avoid recording the silent portion, but when the VAS is set to ineffective, VAS portion 11A controls encoder-decoder 15 not to cut the sound signal of the silent portion. Upon encoding the sound data by encoder-decoder 15, in order to switch the bit rate of the sound signal, sound recording mode switching portion 11B controls encoder-decoder 15 to encode at a designated bit rate.

Figure 3:
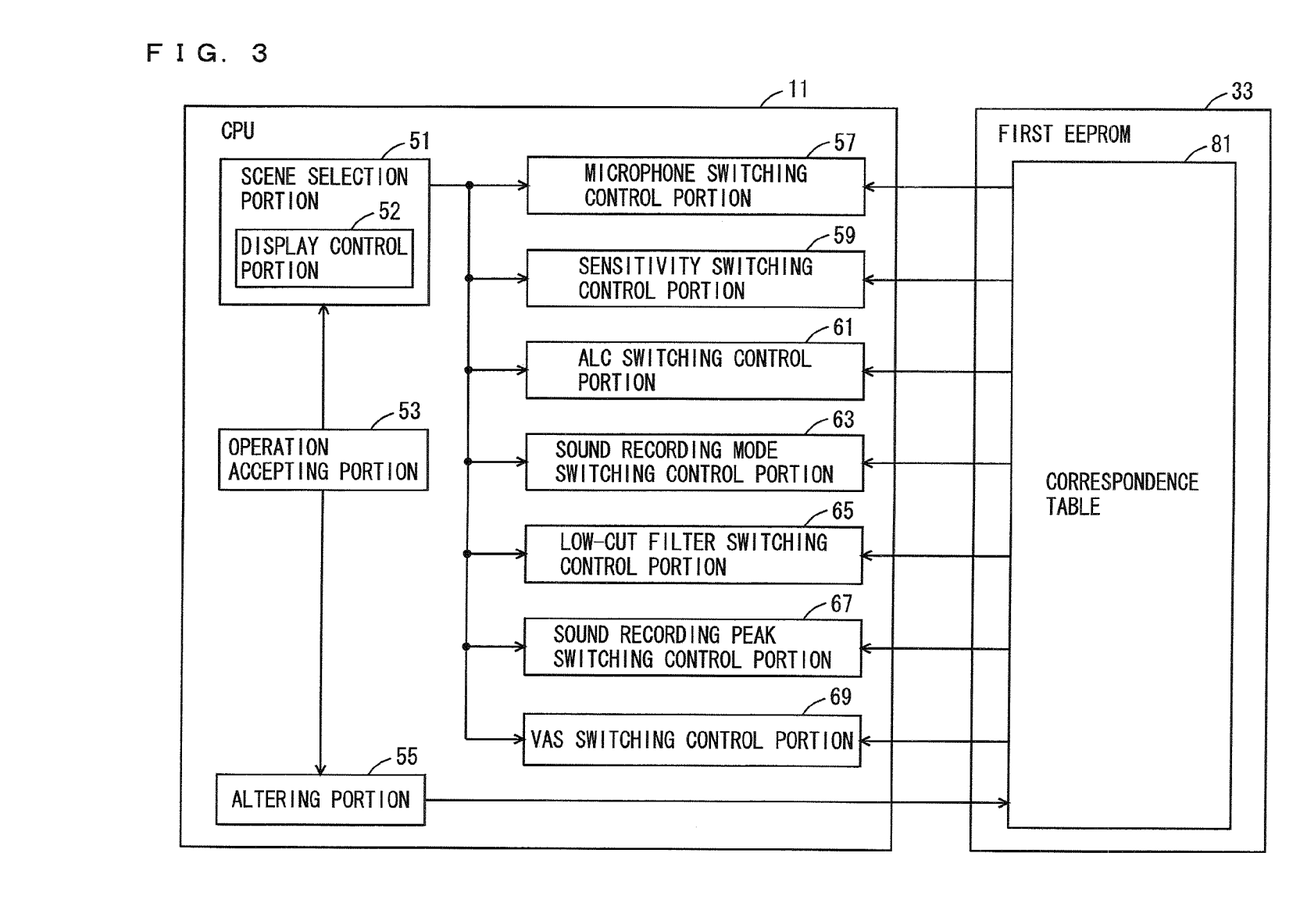
FIG. 3 is a functional block diagram showing an overview of the function of a CPU (Central Processing Unit) along with data stored in a first EEPROM (Electrically Erasable and Programmable Read Only Memory).

FIG. 3 is a functional block diagram showing an overview of the function of the CPU along with data stored in the first EEPROM. With reference to FIG. 3, CPU 11 includes an operation accepting portion 53 for accepting an operation by the user, a scene selection portion 51 for selecting one among a plurality of scenes, a microphone switching control portion 57 for switching to one of directional microphone 17 and non-directional microphone 19, a sensitivity switching control portion 59 for switching the microphone sensitivity, an ALC switching control portion 61 for switching the ALC between effective and ineffective, a sound recording mode switching control portion 63 for switching the sound recording modes, a low-cut filter switching control portion 65 for switching a low-cut filter between effective and ineffective, a sound recording peak switching control portion 67 for switching a sound recording peak limiter between effective and ineffective, and a VAS switching control portion 69 for switching the VAS between effective and ineffective.

Operation accepting portion 53 accepts the operation the user inputs to operation portion 7. Specifically, when the user presses scene key 7A, a scene select instruction for instructing the selection of a scene is accepted. When operation accepting portion 53 accepts the scene select instruction, it outputs the scene select instruction to scene selection portion 51.

Scene selection portion 51 includes a display control portion 52. Display control portion 52 controls LCD 35 and displays an image on LCD 35. More specifically, when the scene select instruction is inputted from operation accepting portion 53, display control portion 52 displays on LCD 35 a scene selection window corresponding to each of a plurality of scenes. Here, the case where scene selection windows corresponding to four scenes are provided in advance will be described as an example. The four scenes are provided with scene information for identifying each of the four scenes, and the scene information include "oral dictation," "conference," "lecture," and "music." The scene specified by the scene information "oral dictation" is the scene where an interview or a conversation between two people is recorded. The scene specified by the scene information "conference" is the scene where a plurality of persons converse and the sound from all directions is recorded. The scene specified by the scene information "lecture" is the scene where the sound from the front is recorded as in the case where a person speaks in front of a plurality of persons. The scene specified by the scene information "music" is the scene where a musical performance, a sound of an animal or the like is recorded in high quality.

Figure 4A:
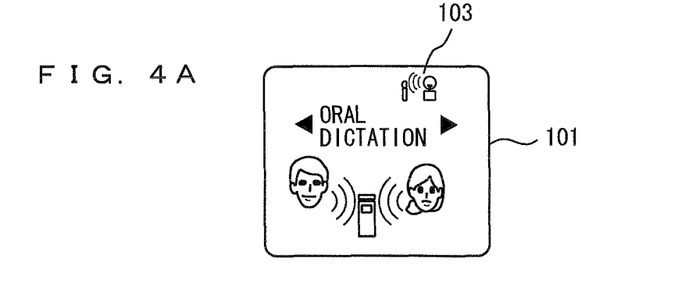
FIGS. 4A to 4D are diagrams illustrating one example of scene selection windows.
Figure 4B:
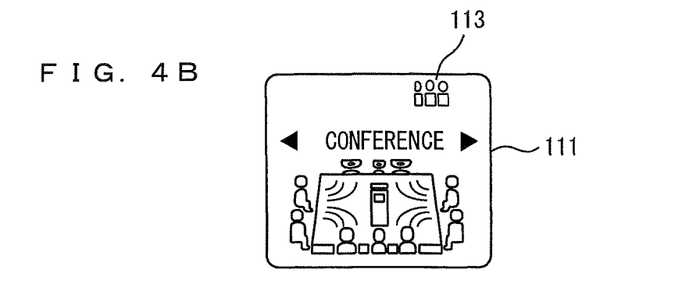
Figure 4C:
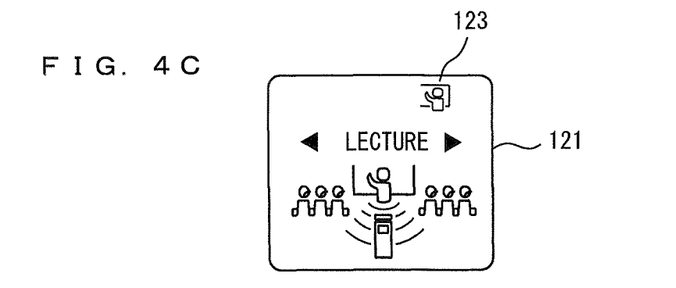
Figure 4D:
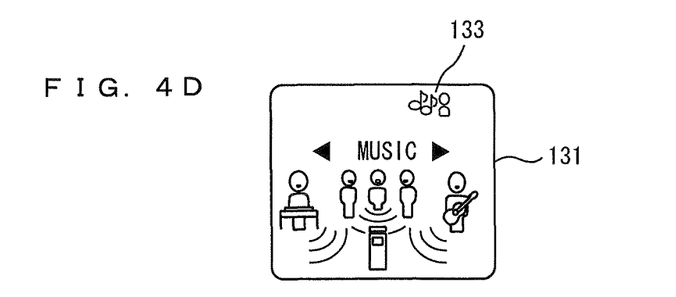

FIGS. 4A to 4D are diagrams illustrating one example of the scene selection windows. FIG. 4A is a diagram illustrating the scene selection window corresponding to the scene information "oral dictation." A scene selection window 101 includes the letters "ORAL DICTATION" and a picture representing the look of two people having a conversation. In addition, a design (an icon) for identifying the selected scene is displayed in the upper right of the window, and this design is switched to a design 103 which corresponds to the scene specified by the scene information "oral dictation." FIG. 4B is a diagram illustrating the scene selection window corresponding to the scene information "conference." A scene selection window 111 includes the letters "CONFERENCE" and a picture representing the look of a conference where a plurality of persons converse. In addition, the design (an icon) for identifying the selected scene is displayed in the upper right of the window, and this design is switched to a design 113 which corresponds to the scene specified by the scene information "conference." FIG. 4C is a diagram illustrating the scene selection window corresponding to the scene information "lecture." A scene selection window 121 includes the letters "LECTURE" and a picture representing the look of a lecture where a person speaks in front of many. In addition, the design (an icon) for identifying the selected scene is displayed in the upper right of the window, and this design is switched to a design 123 which corresponds to the scene specified by the scene information "lecture." FIG. 4D is a diagram illustrating the scene selection window corresponding to the scene information "music." A scene selection window 131 includes the letters "MUSIC" and a picture representing the look of a musical performance. In addition, the design (an icon) for identifying the selected scene is displayed in the upper right of the window, and this design is switched to a design 133 which corresponds to the scene specified by the scene information "music."

Going back to FIG. 3, when the user presses a switch key provided in operation portion 7, scene selection portion 51 switches the scene selection windows displayed on LCD 35 in sequence. Further, when the user presses a decide key provided in operation portion 7, scene selection portion 51 selects the scene corresponding to the scene selection window which is displayed on LCD 35 at that point in time. Scene selection portion 51 outputs the scene information for identifying the scene selected from a plurality of scenes to microphone switching control portion 57, sensitivity switching control portion 59, ALC switching control portion 61, sound recording mode switching control portion 63, low-cut filter switching control portion 65, sound recording peak switching control portion 67, and VAS switching control portion 69, respectively.

Moreover, when a scene is selected by scene selection portion 51, display control portion 52 continues to display the design corresponding to the selected scene among designs 103, 113, 123, 133 respectively shown in FIGS. 4A to 4D even when the scene selection window is switched to another window. Thus, by displaying the design corresponding to the selected scene among designs 103, 113, 123, 133, it is possible to notify the user which of the scenes of oral dictation, conference, lecture, and music is being selected at that time.

Figure 5:
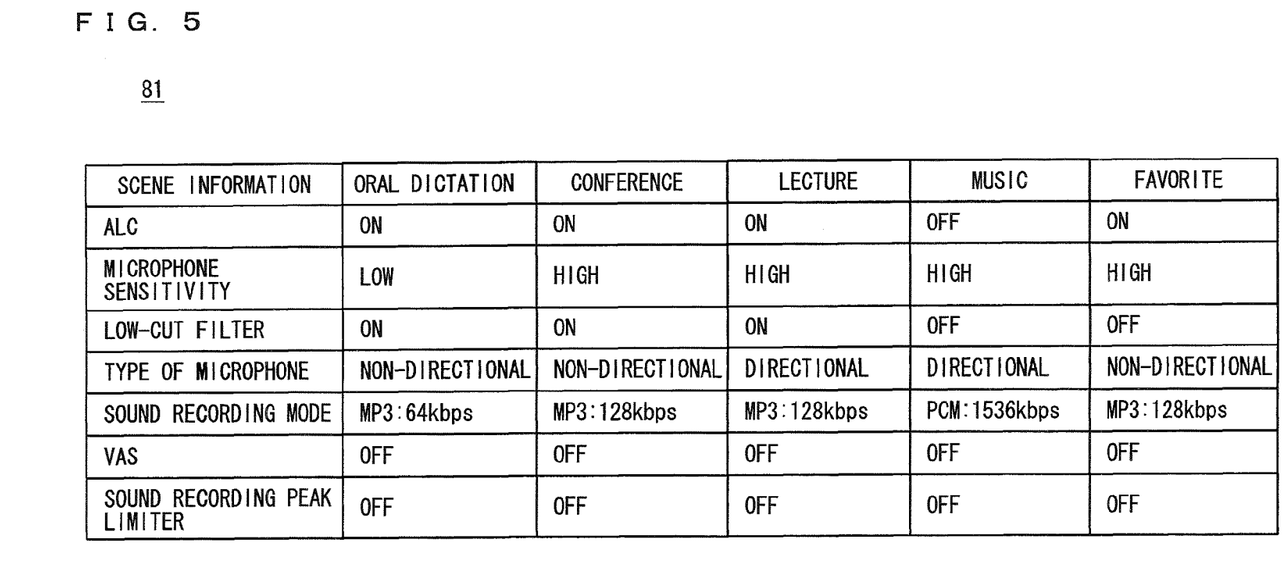
FIG. 5 is a diagram showing an example of a correspondence table.

First EEPROM 33 stores a correspondence table 81. Here, the correspondence table will be described. FIG. 5 is a diagram showing an example of the correspondence table. With reference to FIG. 5, correspondence table 81 associates the ON/OFF of the ALC, the high/low of the microphone sensitivity, the ON/OFF of a low-cut filter, the type of microphone, the sound recording mode, the ON/OFF of the VAS, and the ON/OFF of a sound recording peak limiter as set values for each of the four scenes. Further, correspondence table 81 is also capable of associating the ON/OFF of the ALC, the high/low of the microphone sensitivity, the ON/OFF of the low-cut filter, the type of microphone, the sound recording mode, the ON/OFF of the VAS, and the ON/OFF of the sound recording peak limiter as set values for the scene information "favorite" as a scene that can be set arbitrarily by the user. In this case, a scene selection window corresponding to the scene information "favorite" may be prepared in advance and may be displayed on LCD 35 in the same manner as other scene selection windows to allow its selection in the same manner as other scenes.

Going back to FIG. 3, when the scene information is inputted from scene selection portion 51, microphone switching control portion 57 refers to correspondence table 81 stored in first EEPROM 33 and reads the set value of the type of microphone associated with the scene information. Thereafter, according to the read set value, microphone switching control portion 57 causes codec 13 to select one of directional microphone 17 and non-directional microphone 19. More specifically, if the scene information is associated with the set value "directional" by correspondence table 81, microphone switching control portion 57 causes codec 13 to select directional microphone 17, and if the scene information is associated with the set value "non-directional" by correspondence table 81, it causes codec 13 to select non-directional microphone 19.

When the scene information is inputted from scene selection portion 51, sensitivity switching control portion 59 refers to correspondence table 81 stored in first EEPROM 33 and reads the set value of the microphone sensitivity associated with the scene information. Thereafter, according to the read set value, sensitivity switching control portion 59 causes codec 13 to switch the microphone sensitivity. More specifically, if the scene information is associated with the set value "high" by correspondence table 81, sensitivity switching control portion 59 causes codec 13 to switch the microphone sensitivity to "high," and if the scene information is associated with the set value "low" by correspondence table 81, it causes codec 13 to switch the microphone sensitivity to "low."

When the scene information is inputted from scene selection portion 51, ALC switching control portion 61 refers to correspondence table 81 stored in first EEPROM 33 and reads the set value of the ALC associated with the scene information. Thereafter, according to the read set value, ALC switching control portion 61 causes codec 13 to switch between setting the ALC to effective and setting the ALC to ineffective. More specifically, if the scene information is associated with the set value "ON" by correspondence table 81, ALC switching control portion 61 causes codec 13 to switch the ALC to effective, and if the scene information is associated with the set value "OFF" by correspondence table 81, it causes codec 13 to switch the ALC to ineffective.

When the scene information is inputted from scene selection portion 51, sound recording mode switching control portion 63 refers to correspondence table 81 stored in first EEPROM 33 and reads the set value of the sound recording mode associated with the scene information. Thereafter, sound recording mode switching control portion 63 outputs the read set value to sound recording mode switching portion 11B. Consequently, upon encoding the sound data by encoder-decoder 15, in order to switch the bit rate of the sound signal, sound recording mode switching portion 11B controls encoder-decoder 15 to encode at a designated bit rate. More specifically, if the scene information is associated with the set value "MP3: 64 kbps" by correspondence table 81, sound recording mode switching portion 11B causes encoder-decoder 15 to compress in the compression format of MP3 at the bit rate of 64 kbps; if the scene information is associated with the set value "MP3: 128 kbps" by correspondence table 81, it causes encoder-decoder 15 to compress in the compression format of MP3 at the bit rate of 128 kbps; and if the scene information is associated with the set value "PCM (Pulse Code Modulation): 48 kHz" by correspondence table 81, it causes encoder-decoder 15 to encode at the bit rate of 1536 kbps without compression. Moreover, a sampling frequency may be associated with the scene information, and encoder-decoder 15 may be caused to perform sampling at the sampling frequency associated with the scene information.

When the scene information is inputted from scene selection portion 51, low-cut filter switching control portion 65 refers to correspondence table 81 stored in first EEPROM 33 and reads the set value of the low-cut filter associated with the scene information. Thereafter, according to the read set value, low-cut filter switching control portion 65 causes codec 13 to switch between setting the low-cut filter to effective and setting the low-cut filter to ineffective. More specifically, if the scene information is associated with the set value "ON" by correspondence table 81, low-cut filter switching control portion 65 causes codec 13 to switch the low-cut filter to effective, and if the scene information is associated with the set value "OFF" by correspondence table 81, it causes codec 13 to switch the low-cut filter to ineffective.

When the scene information is inputted from scene selection portion 51, sound recording peak switching control portion 67 refers to correspondence table 81 stored in first EEPROM 33 and reads the set value of the sound recording peak limiter associated with the scene information. Thereafter, according to the read set value, sound recording peak switching control portion 67 causes codec 13 to switch between setting the sound recording peak limiter to effective and setting the sound recording peak limiter to ineffective. More specifically, if the scene information is associated with the set value "ON" by correspondence table 81, sound recording peak switching control portion 67 causes codec 13 to switch the sound recording peak limiter to effective, and if the scene information is associated with the set value "OFF" by correspondence table 81, it causes codec 13 to switch the sound recording peak limiter to ineffective.

When the scene information is inputted from scene selection portion 51, VAS switching control portion 69 refers to correspondence table 81 stored in first EEPROM 33 and reads the set value of the VAS associated with the scene information. Thereafter, according to the read set value, VAS switching control portion 69 causes codec 13 to make VAS portion 11A switch between setting the VAS to effective and ineffective. More specifically, if the scene information is associated with the set value "ON" by correspondence table 81, the VAS is set to effective. Consequently, in order to cut to avoid recording the silent portion in the sound data, VAS portion 11A controls encoder-decoder 15 to cut the sound signal of the silent portion.

An altering portion 55 alters the content of correspondence table 81 according to an operation the user inputs into operation portion 7. For every five scenes in correspondence table 81, altering portion 55 displays the set values associated with those scenes on LCD 35, and when the user inputs a set value into operation portion 7, altering portion 55 alters the set value in correspondence table 81 to the inputted set value. Since the user is able to alter correspondence table 81 freely, the set values suited to the user's usage can be set for each scene.

Figure 6:
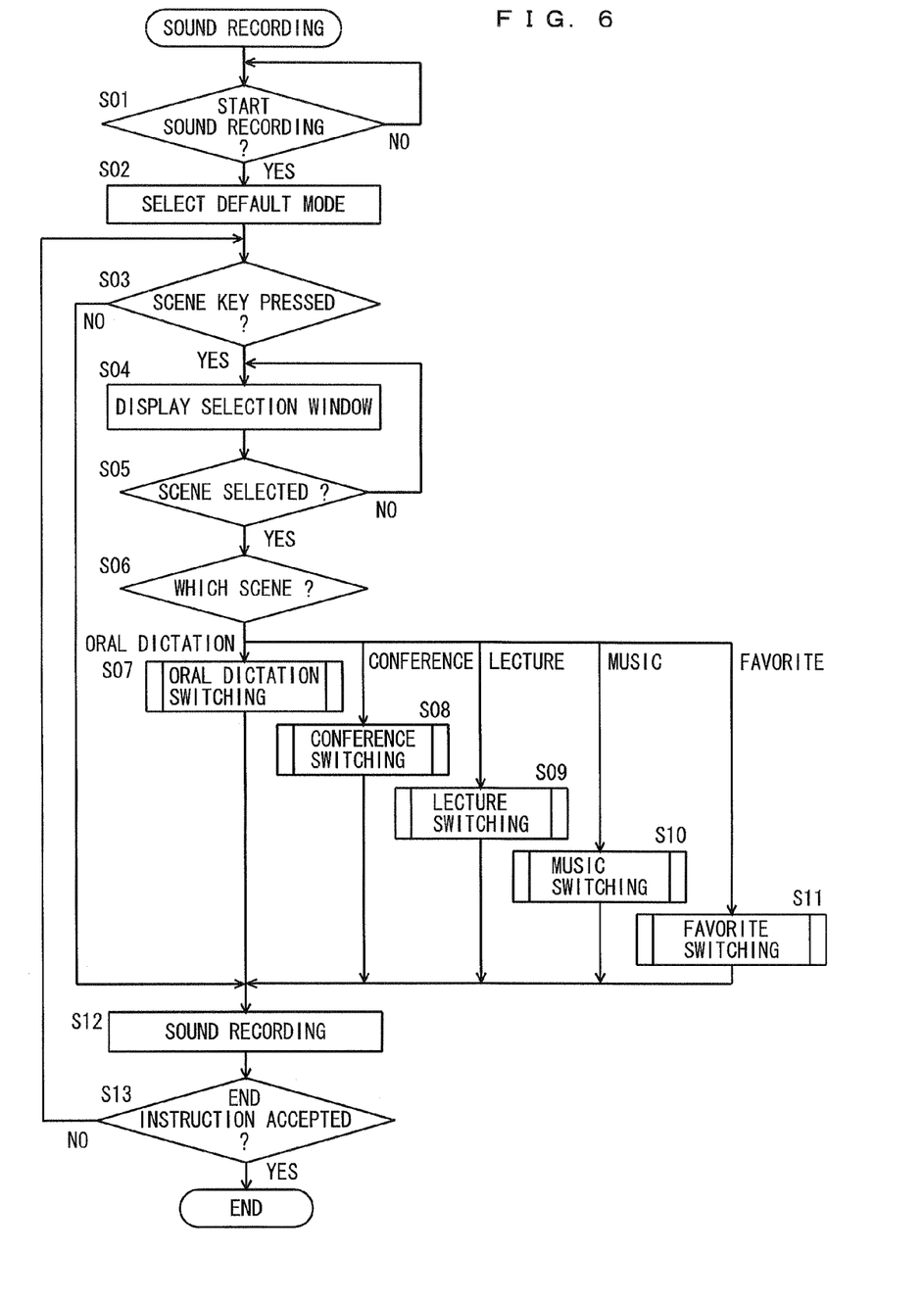
FIG. 6 is a flow chart showing an example of the flow of a sound recording process.

FIG. 6 is a flow chart showing an example of the flow of a sound recording process. The sound recording process is a process executed by CPU 11 when CPU 11 executes a sound recording program. With reference to FIG. 6, CPU 11 determines whether the instruction to start a recording has been accepted or not (step S01). The process remains on standby until the instruction to start the recording is accepted (NO in step S01), and the process proceeds to step S02 if the instruction to start the recording is accepted. In other words, the sound recording process is a process that is executed provided that the instruction to start the recording is accepted. For instance, when a record key provided in operation portion 7 is pressed by the user, the instruction to start the recording is accepted.

In step S02, a default mode is selected, and the process proceeds to step S03. In the default mode, predetermined set values are set. Here, the set values associated with the scene information "oral dictation" in correspondence table 81 stored in first EEPROM 33 are set as the set values in the default mode.

In step S03, it is determined whether scene key 7A has been pressed or not. If the pressing of scene key 7A is detected, the process proceeds to step S04, but if not, the process proceeds to step S12.

In step S04, scene selection windows are displayed on LCD 35. The four scene selection windows shown in FIGS. 4A to 4D are displayed sequentially. Then, in the next step S05, it is determined whether a scene has been selected or not. If a scene has been selected, the process proceeds to step S06, but if not, the process returns to step S04. At the point when decide key provided in operation portion 7 is pressed, the scene corresponding to the scene selection window displayed on LCD 35 is selected.

In step S06, the process branches out according to the scene selected in step S05. If the scene information of the selected scene is "oral dictation," the process proceeds to step S07; if it is "conference," the process proceeds to step S08; if it is "lecture," the process proceeds to step S09; if it is "music," the process proceeds to step S10; and if it is "favorite," the process proceeds to step S11.

In step S07, an oral dictation switching process is executed, and the process proceeds to step S12. In step S08, a conference switching process is executed, and the process proceeds to step S12. In step S09, a lecture switching process is executed, and the process proceeds to step S12. In step S10, a music switching process is executed, and the process proceeds to step S12. In step S11, a favorite switching process is executed, and the process proceeds to step S12.

In step S12, the sound recording is started. In the next step S13, it is determined whether the instruction to end the sound recording has been accepted or not, and if the instruction to end the sound recording has been accepted, the process is terminated, but if not, the process returns to step S03. For instance, if a stop key provided in operation portion 7 is pressed by the user, the instruction to end the sound recording is accepted.

Figure 7:
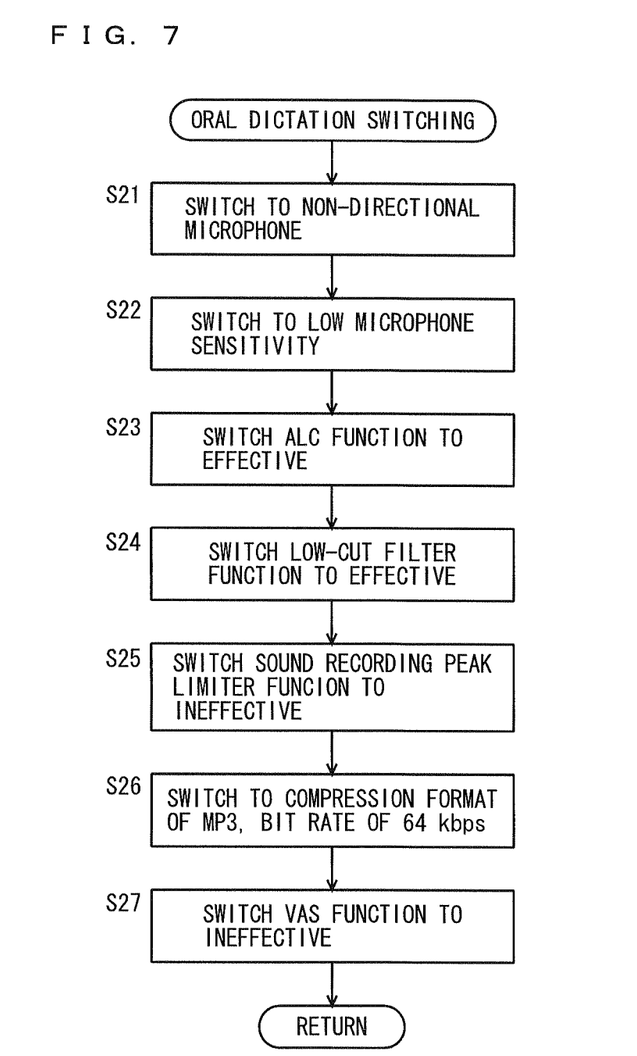
FIG. 7 is a flow chart showing an example of the flow of an oral dictation switching process.

FIG. 7 is a flow chart showing an example of the flow of the oral dictation switching process. The oral dictation switching process is a process executed in step S07 of FIG. 6. With reference to FIG. 7, CPU 11 refers to correspondence table 81 stored in first EEPROM 33 and controls codec 13 to do the following: to switch so as to process a sound signal outputted by non-directional microphone 19 (step S21); to switch the microphone sensitivity to low (step S22); to switch the ALC to effective (step S23); to set the low-cut filter to effective (step S24); and to switch the sound recording peak limiter to ineffective (step S25). Further, CPU 11 controls encoder-decoder 15 to compress in the compression format of MP3 at the bit rate of 64 kbps (step S26) and to switch the VAS to ineffective (step S27), and the process returns to the sound recording process.

Figure 8:
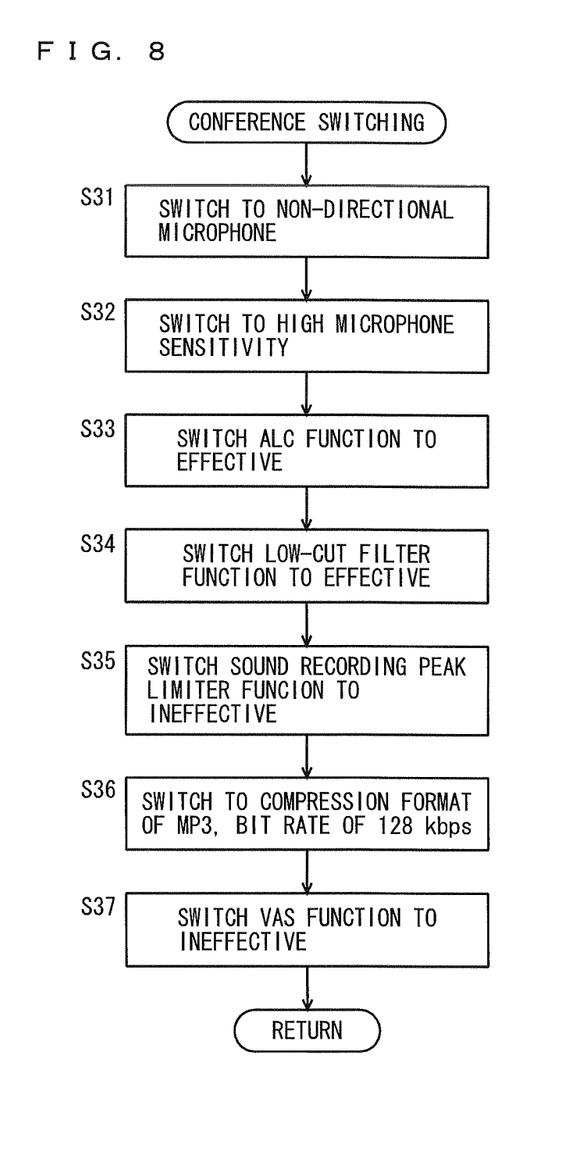
FIG. 8 is a flow chart showing an example of the flow of a conference switching process.

FIG. 8 is a flow chart showing an example of the flow of the conference switching process. The conference switching process is a process executed in step S08 of FIG. 6. With reference to FIG. 8, CPU 11 refers to correspondence table 81 stored in first EEPROM 33 and controls codec 13 to do the following: to switch so as to process a sound signal outputted by non-directional microphone 19 (step S31); to switch the microphone sensitivity to high (step S32); to switch the ALC to effective (step S33); to set the low-cut filter to effective (step S34); and to switch the sound recording peak limiter to ineffective (step S35). Further, CPU 11 controls encoder-decoder 15 to compress in the compression format of MP3 at the bit rate of 128 kbps (step S36) and to switch the VAS to ineffective (step S37), and the process returns to the sound recording process.

Figure 9:
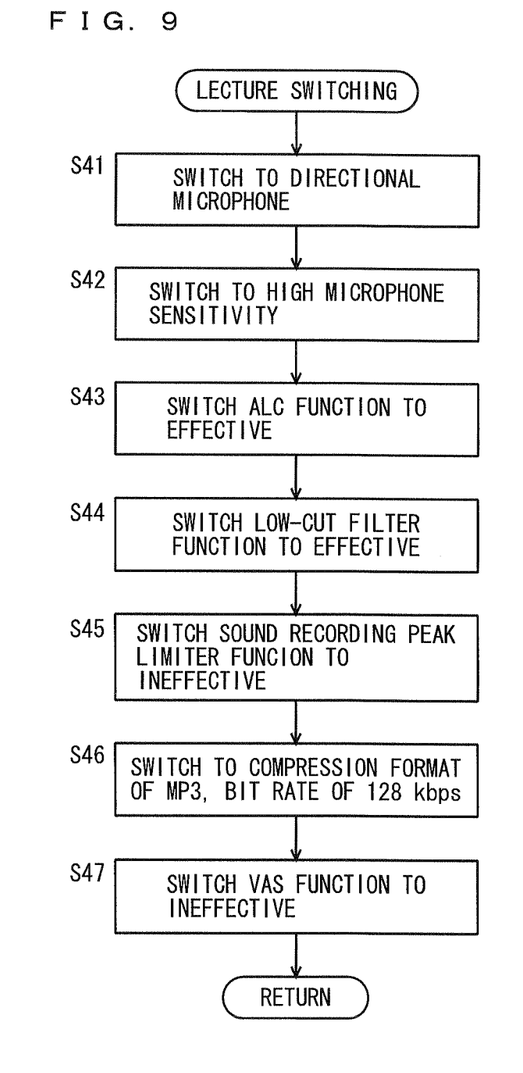
FIG. 9 is a flow chart showing an example of the flow of a lecture switching process.

FIG. 9 is a flow chart showing an example of the flow of the lecture switching process. The lecture switching process is a process executed in step S09 of FIG. 6. With reference to FIG. 9, CPU 11 refers to correspondence table 81 stored in first EEPROM 33 and controls codec 13 to do the following: to switch so as to process a sound signal outputted by directional microphone 17 (step S41); to switch the microphone sensitivity to high (step S42); to switch the ALC to effective (step S43); to set the low-cut filter to effective (step S44); and to switch the sound recording peak limiter to ineffective (step S45). Further, CPU 11 controls encoder-decoder 15 to compress in the compression format of MP3 at the bit rate of 128 kbps (step S46) and to switch the VAS to ineffective (step S47), and the process returns to the sound recording process.

Figure 10:
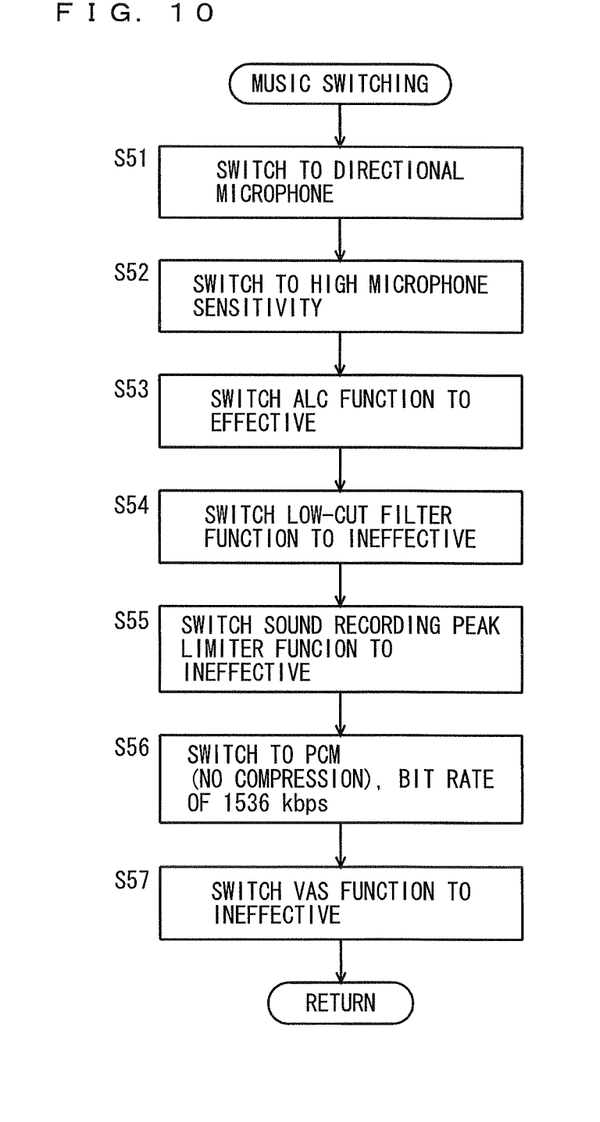
FIG. 10 is a flow chart showing an example of the flow of a music switching process.

FIG. 10 is a flow chart showing an example of the flow of the music switching process. The music switching process is a process executed in step S10 of FIG. 6. With reference to FIG. 10, CPU 11 refers to correspondence table 81 stored in first EEPROM 33 and controls codec 13 to do the following: to switch so as to process a sound signal outputted by directional microphone 17 (step S51); to switch the microphone sensitivity to high (step S52); to switch the ALC to effective (step S53); to set the low-cut filter to ineffective (step S54); and to switch the sound recording peak limiter to ineffective (step S55). Further, CPU 11 controls encoder-decoder 15 to encode at the bit rate of 1536 kbps without compression (step S56) and to switch the VAS to ineffective (step S57), and the process returns to the sound recording process.

Figure 11:
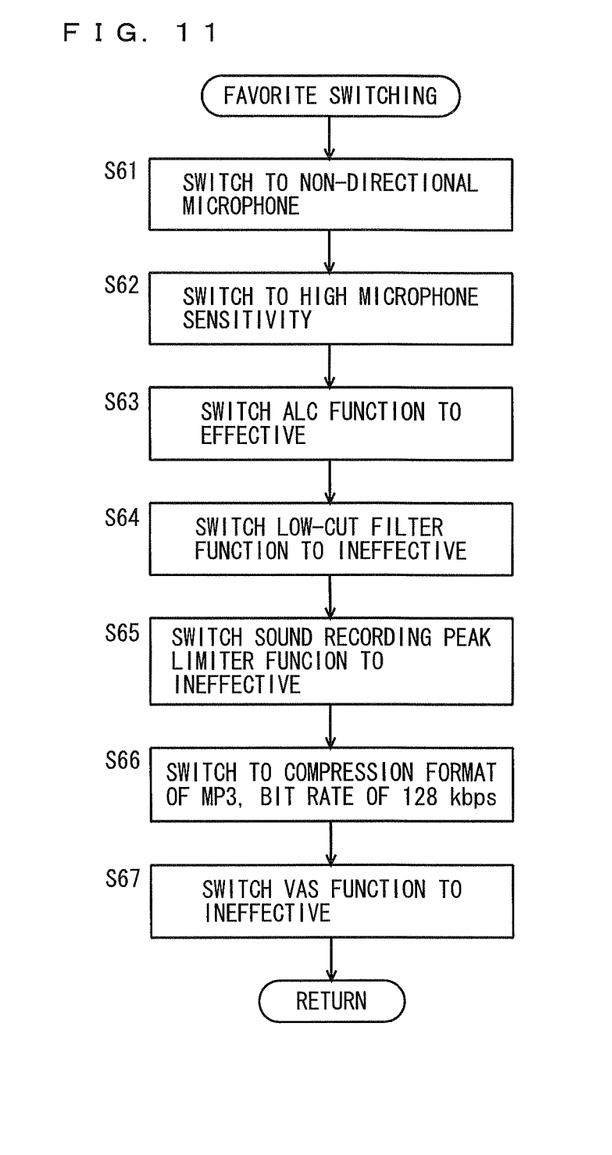
FIG. 11 is a flow chart showing an example of the flow of a favorite switching process.

FIG. 11 is a flow chart showing an example of the flow of the favorite switching process. The favorite switching process is a process executed in step S11 of FIG. 6. With reference to FIG. 11, CPU 11 refers to correspondence table 81 stored in first EEPROM 33 and controls codec 13 to do the following: to switch so as to process a sound signal outputted by non-directional microphone 19 (step S61); to switch the microphone sensitivity to high (step S62); to switch the ALC to effective (step S63); to set the low-cut filter to ineffective (step S64); and to switch the sound recording peak limiter to ineffective (step S65). Further, CPU 11 controls encoder-decoder 15 to compress in the compression format of MP3 at the bit rate of 128 kbps (step S66) and to switch the VAS to ineffective (step S67), and the process returns to the sound recording process.

As described above, IC recorder 1 as a sound recording device according to the present embodiment stores in advance a correspondence table that assigns either one of directional microphone 17 and non-directional microphone 19 to each of the four scenes of oral dictation, conference, lecture, and music, and in response to the selection of one scene from a plurality of scenes, the microphone is switched between directional microphone 17 and non-directional microphone 19 to the one assigned by the correspondence table to the selected scene. Thus, the user can select the suitable microphone simply by selecting one of a plurality of scenes, and there is no need to choose between a directional microphone and a non-directional microphone, which facilitates the operation.

In addition, the correspondence table associates a microphone sensitivity with each of the four scenes, and in response to the selection of one of four scenes, the microphone sensitivity is switched to that which is associated with the selected scene by the correspondence table so that the user needs only to select one scene from a plurality of scenes to have the microphone and the microphone sensitivity appropriately selected. Thus, the user is not required to choose between the directional microphone and the non-directional microphone or to set the microphone sensitivity, which facilitates the setup.

Moreover, the correspondence table associates with each of the four scenes the setting of whether to make the auto level control for changing the input level to a suitable level effective or not so that the user can appropriately set the auto level control simply by selecting one of the four scenes, which facilitates the operation.

Further, the correspondence table associates a bit rate for encoding the sound data with each of the four scenes so that the user can appropriately set the bit rate for encoding simply by selecting one of the four scenes, which facilitates the operation.

Furthermore, the correspondence table can be altered by an operation by the user so that the setting according to the user's preference can be selected with ease.

Moreover, a scene selection window is displayed in response to the pressing of scene key 7A as a hard key so that the operation for the user to select a scene can be simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound recording device, comprising:
   a directional microphone;
   a non-directional microphone;
   a selection portion to select one of a plurality of scenes;
   a storing portion to store in advance a correspondence table that assigns a plurality of recording conditions to each of said plurality scenes, wherein
      said plurality of scenes include an oral dictation scene recording an interview and a conversation between two people, a conference scene where a plurality of persons converse recording the sound from all directions, a lecture scene recording the sound from the front as in a case where a person speaks in front of a plurality of persons, and a music scene recording a musical performance, a sound of an animal or the like in high quality, and further wherein
      said plurality of recording conditions include an auto level control indicating whether or not to make auto level control for changing an input level to a suitable level effective or not, a microphone assigning either one of said directional microphone and said non-directional microphone, and an encoding bit rate indicating a bit rate of encoding sound data;
   an auto level control switching control portion to set auto level control of said correspondence table corresponding to a scene selected by said selection portion;
   a sensitivity switching control portion to switch a setting of the microphone sensitivity of said correspondence table corresponding to a scene selected by said selection portion;
   a microphone switching control portion to switch a setting of the type of microphone of said correspondence table corresponding to a scene selected by said selection portion; and
   a sound recording mode switching control portion to switch a setting of the encoding bit rate of said correspondence table corresponding to a scene selected by said selection portion.

2. The sound recording device according to claim 1, wherein said microphone switching control portion switches, in a case where said first scene is selected, to said non-directional microphone.

3. The sound recording device according to claim 1, wherein said microphone switching control position switches, in a case where said second scene is selected, to said directional microphone.

4. The sound recording device according to claim 1, wherein said microphone switching control portion switches, in a case where said third scene is selected, to said directional microphone.

5. The sound recording device according to claim 1, further comprising:
   a recording portion to record through said directional microphone and said non-directional microphone; and
   a recording control portion to control said recording portion to record on the recording conditions being set by said auto level control switching control portion, said sensitivity switching control portion, said microphone switching control portion, and said recording mode switching control portion.

6. A sound recording method for controlling a sound recording device having
   a directional microphone, and
   a non-directional microphone, comprising the steps of:
   selecting one of a plurality of scenes for recording based on the operation of the user;
   switching to either one of said directional microphone and said non-directional microphone in response to one of said plurality of scenes being selected in said selecting step;
   recording sound outputted by one of said directional microphone and said non-directional microphone switched in said switching step;
   storing in advance in a storing portion a correspondence table that assigns a plurality of recording conditions to each of said plurality of scenes, wherein said plurality of scenes include an oral dictation scene recording an interview and a conversation between two people, a conference scene where a plurality of persons converse recording the sound from all directions, a lecture scene recording the sound from the front as in a case where a person speaks in front of a plurality of persons, and a music scene recording a musical performance, a sound of an animal or the like in high quality, and further wherein said plurality of recording conditions include an auto level control indicating whether or not to make auto level control for changing an input level to a suitable level effective or not, a microphone assigning either one of said directional microphone and said non-directional microphone, and an encoding bit rate indicating a bit rate of encoding sound data;
   setting an auto level control of said correspondence table corresponding to a scene selected by said selection portion using an auto level control switching control portion;
   switching a setting of the microphone sensitivity of said correspondence table corresponding to a scene selected by said selection portion using s sensitivity switching control portion;
   switching a setting of the type of microphone of said correspondence table corresponding to a scene selected by said selection portion using a microphone switching control portion; and
   switching a setting of the encoding bit rate of said correspondence table corresponding to a scene selected by said selection portion using a sound recording mode switching control portion.

7. The sound recording method according to claim 6, comprising the additional steps of:
   recording through said directional microphone and said non-directional microphone a recording portion; and controlling portion to control said recording portion using a recording control portion to record on the recording condition being set by said auto level control switching control portion, said sensitivity switching control portion, said microphone switching control portion, and said recording mode switching control portion.

8. A non-transitory computer readable storage medium storing a sound recording program and executed by a computer controlling a sound recording device having a directional microphone, and a non-directional microphone, the sound recording program causing said computer to execute the steps of;

selecting one of a plurality of scenes for recording based on the operation of a user; switching to either one of said directional microphone and said non-directional microphone in response to one of said plurality of scenes being selected in said selecting step; and recording sound outputted by one of said directional microphone and said non-directional microphone switched in said switching step, storing in advance in a storing portion a correspondence table that assigns a plurality of recording conditions to each of aid plurality of scenes, wherein said plurality of scenes include an oral dictation scene recording an interview and a conversation between two people, a conference scene where a plurality of persons converse recording the sound from all directions, a lecture scene recording the sound from the front as in a case where a person speaks in front of a plurality of persons, and a music scene recording a musical performance, a sound of an animal or the like in high quality, and further wherein said plurality of recording conditions include an auto level control indicating whether or not to make auto level control for changing an input level to a suitable level effective or not, a microphone assigning either one of said directional microphone and said non-directional microphone, and an encoding bit rate indicating a bit rate of encoding sound data;

setting an auto level control of said correspondence table corresponding to a scene selected by said selection portion using an auto level control switching control portion;

switching a setting of the microphone sensitivity of said correspondence table corresponding to a scene selected by said selection portion using s sensitivity switching control portion;

switching a setting of the type of microphone of said correspondence table corresponding to a scene selected by said selection portion using a microphone switching control portion; and switching a setting of the encoding bit rate of said correspondence table corresponding to a scene selected by said selection portion using a sound recording mode switching control portion.

9. The non-transitory computer readable storage medium according to claim 8, wherein the sound recording program causes the computer to execute the additional steps of:

recording through said directional microphone and said non-directional microphone a recording portion; and controlling said recording portion using a recording control portion to record on the recording conditions being set by said auto level control switching control portion, said sensitivity switching control portion, said microphone switching control portion, and said recording mode switching control portion.

* * * * *